United States Patent
Tebo

(10) Patent No.: US 10,407,898 B2
(45) Date of Patent: Sep. 10, 2019

(54) DECKING CLIP

(71) Applicant: Glenn J. Tebo, Kingston, NH (US)

(72) Inventor: Glenn J. Tebo, Kingston, NH (US)

( * ) Notice: Subject to any disclaimer, the term of this patent is extended or adjusted under 35 U.S.C. 154(b) by 0 days.

(21) Appl. No.: 15/844,284

(22) Filed: Dec. 15, 2017

(65) Prior Publication Data
US 2018/0127973 A1    May 10, 2018

Related U.S. Application Data

(62) Division of application No. 15/383,538, filed as application No. PCT/US2015/036747 on Jun. 19, 2015.

(60) Provisional application No. 62/015,363, filed on Jun. 20, 2014.

(51) Int. Cl.
| | |
|---|---|
| *E04B 1/41* | (2006.01) |
| *E04B 5/02* | (2006.01) |
| *E04B 5/12* | (2006.01) |
| *F16B 5/00* | (2006.01) |
| *B25B 23/06* | (2006.01) |
| *B25C 3/00* | (2006.01) |
| *E04B 1/00* | (2006.01) |
| *E04F 15/02* | (2006.01) |

(52) U.S. Cl.
CPC ............. *E04B 1/40* (2013.01); *B25B 23/06* (2013.01); *B25C 3/002* (2013.01); *E04B 1/003* (2013.01); *E04B 5/023* (2013.01); *E04B 5/12* (2013.01); *E04F 15/02183* (2013.01); *F16B 5/0056* (2013.01)

(58) Field of Classification Search
CPC ..... B25B 23/005; B25B 21/002; B25B 23/06; B25C 7/00; E04F 21/22; B27F 7/02; B27C 7/00; E04B 1/40
USPC .................................................. 227/151, 121
See application file for complete search history.

(56) References Cited

U.S. PATENT DOCUMENTS

| | | | | |
|---|---|---|---|---|
| 3,930,297 A | * | 1/1976 | Potucek ................ | B25B 23/045 29/431 |
| 5,542,323 A | * | 8/1996 | Habermehl ........... | B25B 23/045 206/347 |
| 5,971,688 A | * | 10/1999 | Anstett .................... | B25C 1/00 411/442 |
| 2001/0054635 A1 | * | 12/2001 | Schmitz ................ | B25C 5/1693 227/15 |

(Continued)

*Primary Examiner* — Beth A Stephan
(74) *Attorney, Agent, or Firm* — Grossman, Tucker, Perreault & Pfleger, PLLC

(57) ABSTRACT

The present disclosure is directed to a single-sided deck clip that allows an approach to deck board installation with hidden fasteners, and without grooving both edges of a deck board. By not grooving edges, perimeter trim can include one square finished edge on ending pieces. The single-sided clip allows for attaching fasteners through the clip at an angle that penetrates both a deck board and an underlying joist, thus providing a positive connection of decking to joist framing below. In another embodiment, a clip magazine is disclosed that stores, supplies, and assists in installation of single-sided deck clips and fasteners. The clip magazine can hold a plurality fasteners and single-sided deck clips. The magazine allows the single-sided clips and fasteners to be positioned relative to the deck board, and allows fasteners to be aligned with a single-sided clip, and pushed into a deck board during installation.

20 Claims, 13 Drawing Sheets

(56) References Cited

U.S. PATENT DOCUMENTS

| | | | | |
|---|---|---|---|---|
| 2009/0095786 | A1* | 4/2009 | Gosis | B25C 1/188 |
| | | | | 227/119 |
| 2009/0200354 | A1* | 8/2009 | Arata | B25C 1/005 |
| | | | | 227/132 |
| 2010/0140313 | A1* | 6/2010 | Zahner | B25C 1/184 |
| | | | | 227/8 |
| 2010/0181362 | A1* | 7/2010 | Martel | B25B 21/002 |
| | | | | 227/120 |
| 2010/0206934 | A1* | 8/2010 | Vallon | B25C 1/005 |
| | | | | 227/109 |
| 2010/0213237 | A1* | 8/2010 | Tebo | B25C 7/00 |
| | | | | 227/148 |
| 2013/0320065 | A1* | 12/2013 | Gregory | B25C 1/00 |
| | | | | 227/119 |
| 2014/0001228 | A1* | 1/2014 | Shadwell | B25C 7/00 |
| | | | | 227/151 |
| 2014/0021236 | A1* | 1/2014 | Martel | E04F 15/02044 |
| | | | | 227/18 |
| 2014/0138422 | A1* | 5/2014 | Ronconi | B25C 1/001 |
| | | | | 227/18 |
| 2014/0161561 | A1* | 6/2014 | Tebo | F16B 15/06 |
| | | | | 411/493 |
| 2014/0305068 | A1* | 10/2014 | Svanberg | B25B 23/045 |
| | | | | 52/711 |
| 2015/0122867 | A1* | 5/2015 | Segura | B25C 1/005 |
| | | | | 227/109 |
| 2017/0106513 | A1* | 4/2017 | Orchard | B25C 1/001 |
| 2017/0114554 | A1* | 4/2017 | LeVey | E04F 15/02044 |
| 2018/0223547 | A1* | 8/2018 | Demuth | B25C 5/1693 |

* cited by examiner

DECKING CLIP

CROSS-REFERENCE TO RELATED APPLICATIONS

This application is a divisional of U.S. patent application Ser. No. 15/383,538 filed Dec. 19, 2016, which is a continuation of International Patent Application No. PCT/US15/36747, filed Jun. 19, 2015, designating the U.S. and claiming the benefit of U.S. Provisional Patent Application Ser. No. 62/015,363, titled "Decking Clip," filed on Jun. 20, 2014, the entire disclosures of which are incorporated herein by reference.

FIELD

The present disclosure relates generally to securing panels used in construction of a structure, and more particularly, to a decking clip and clip magazine to install deck boards.

BACKGROUND

Property owners have numerous decking system options when designing a new deck, or when updating an existing deck. These decking systems generally include a fastener to ensure that deck boards get securely attached to underlying joists. Some such example fasteners include screws, nails, or staples. In some cases, securing deck boards includes driving a fastener through the face of deck boards. This means that the top, or head, of fasteners remain visible. The visibility of these fasteners can detract from the natural beauty of the material chosen for deck boards, and worse yet, become increasingly unsightly overtime. For example, metal fasteners have a tendency to rust and to also discolor adjacent deck boards. Moreover, fasteners may loosen overtime and become a safety hazard to persons walking across the deck. More recent decking systems and methods seek to secure decking boards to joists without driving a fastener through the face of deck boards.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

DETAILED DESCRIPTION

Figure 1A:
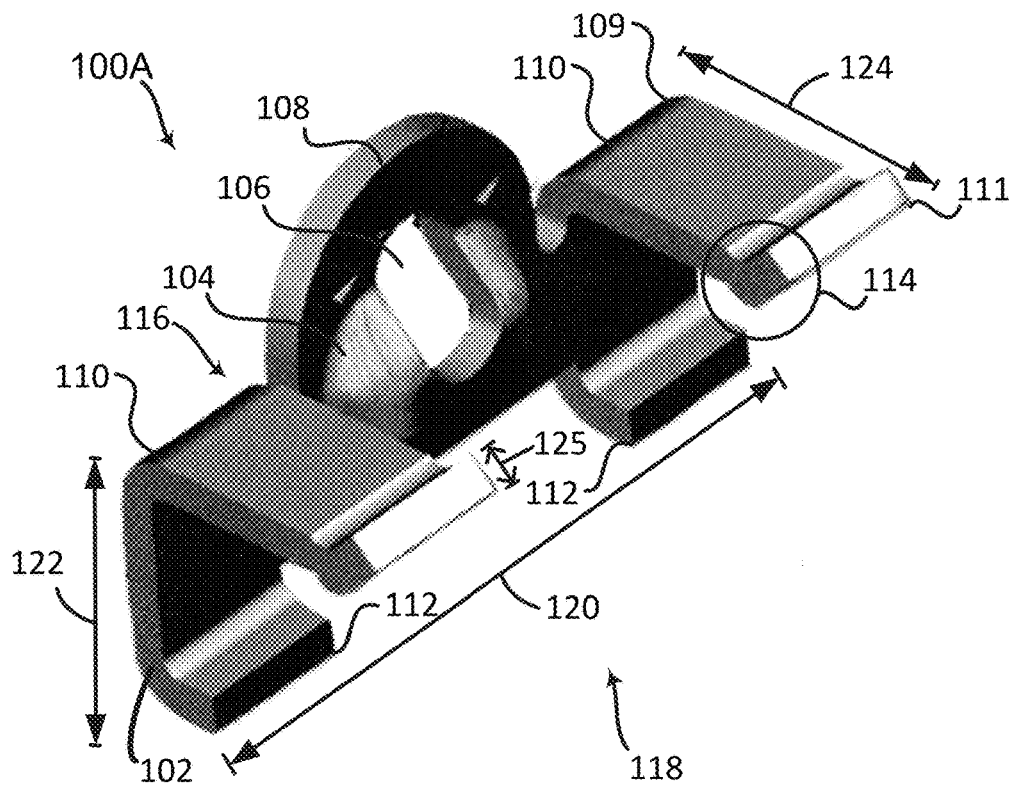
FIG. 1A illustrates a perspective view of a single-sided clip in accordance with an embodiment of the present disclosure.

As previously discussed, modern decking systems seek to avoid securing deck boards with unsightly fasteners, such as those driven through a face of a board and into an underlying joist. To mitigate this problem, some decking systems use hidden or otherwise obscured clips. These hidden clips can include a vertical body and arms extending out perpendicular relative to the body in substantially a T shape. These arms are configured to be inserted into pre-grooved deck boards, with those deck boards having a groove that runs lengthwise along both length-wise sides of a deck board. Such deck boards are generally referred to as double-grooved deck boards, and such hidden fasteners are generally referred to as double-grooved decking clips. During installation, a first deck board is secured to a deck structure by first securing down the vertical body of the hidden clip, often by directly screwing or otherwise driving a fastener through the clip and into an underlying joist. Once the clip is secured, the first board can be placed adjacent the clip such that one of the arms at least partially enters the first deck board's groove. This leaves a free arm for a second deck board to be placed on an opposite side of the clip, with that free arm extending into the second deck board's groove.

Unfortunately, this means that each deck board depends on the arms of the hidden fastener for grip strength. This is because the fastener is driven through the clip and into an underlying joist, and not through the deck board. Moreover, the edge or perimeter of each deck can include a visible groove because, as is the customary standard, manufacturers pre-groove both sides of each deck board.

Thus, in accordance with an embodiment of the present disclosure, a single-sided deck clip is disclosed that allows an approach to deck board installation with hidden fasteners, and without grooving both edges of a deck board. By not grooving edges, perimeter trim, and stair tread nosing, for example, can include one square finished edge on ending pieces. Moreover, the single-sided clip disclosed herein allows attaching fasteners through the clip at an angle that penetrates both a deck board and an underlying joist, or other structure. This can provide a positive connection of decking to joist framing below. In another embodiment, a clip magazine is disclosed herein that stores, supplies, and assists in installation of single-sided deck clips and fasteners. The clip magazine can hold a plurality of collated, or loose, fasteners and single-sided deck clips. The magazine allows the single-sided clips and fasteners to be positioned relative to the deck board, and allows the fastener to be aligned and pushed through a single-sided clip, and into a deck board during installation.

As generally referred to herein, a single-sided deck clip generally refers to a clip that includes arm(s) extending perpendicular to the clip on only one side. That is, unlike double-grooved deck clips that form substantially a T shape, the single-sided deck clip disclosed herein includes arm(s) on only one side. A back portion of the single-sided clip is flat, or configured with barbs, and allows the single-sided clip to sit flat against the side of a deck board. The single-sided deck clip can include one or more fastener holes. The fastener holes can allow a fastener, such as a screw, nail, staple or other suitable fastener, to pass through the clip and into a deck board resting against the back portion. With the clip secured against the deck board, the arms of the clip extend from a front portion of the clip perpendicular to that of the body of the clip (and also relative to the side of the deck board). Thus, another deck board can be positioned against the front side of the clip such that the arms of the clip at least partially enter the deck board's groove. The clips are configured to allow expansion and contraction of the deck boards, and to facilitate spacing between adjacent deck boards. For example, the single-sided clips can include a spacer portion configured to separate each deck board by a suitable amount to allow such expansion and contraction to occur. The resulting gap formed between adjacent deck boards can assist when, for example, liquid must be expelled from a deck surface.

The clip magazine disclosed herein can include a lower portion and an upper portion, in accordance with an embodiment. The lower portion can be configured to hold multiple single-sided clips. The single-sided clips can be loaded into the lower portion as collated clips, or loose. On the other hand, the upper portion can be configured to hold multiple fasteners. The fasteners can be loaded into the upper portion as collated fasteners, or loose. The upper portion can be angled relative to the lower portion such that fasteners can be pushed through an opening of a clip, and out the lower portion of the clip magazine. During installation of deck boards, a flange between the lower and upper portion can be used to position the clip magazine relative to the deck board. A drill drive tool can be placed into an opening in the upper portion, and make contact with a fastener head. The drive tool can push the fastener through to the lower portion, and through a fastener hole in a clip. So, a user can drive a fastener through the clip magazine and into the side of a deck board. The angle of exit allows the fastener to penetrate not only the side of the deck board, but the underlying joist or structure. A tool such as a drill, pneumatic gun, or other suitable device can be used to drive the fastener through the deck board using the clip magazine. This tool can be integrated with the clip magazine or otherwise used in conjunction with the clip magazine.

Numerous advantageous will be apparent in light this disclosure. For example, the overall structure of a deck, using the system and methods disclosed herein, can provide greater support than those decking systems that do not attach fasteners through decking boards. In addition, the single-sided clip can work with both single-grooved and double-grooved deck boards. In regards to single-grooved boards, the single-sided deck clip disclosed herein can attach to a flat or otherwise un-grooved side and be securely attached through the side of the deck board. In regards to double-grooved deck boards, the single-sided clip disclosed herein can securely attach in a similar manner as fasteners are driven at an angle through the sides of deck boards. In any event, single-grooved boards can be used to advantageously finish the perimeter of a deck, or other similar structure such that a square finished edge is visible versus a grooved edge. Also, decks completed with the single-sided clip disclosed herein are substantially hidden or otherwise obscured from view.

In addition, the clip magazine can provide additional advantages. Although optional during the installation of deck clips, the clip magazine can assist users in elevating deck clips to a proper height, and assist in driving fasteners at a proper angle during deck board installation. This proper height insures that the arms of the deck clips can enter a groove of an adjacent board, without constant measurement or other manual interaction. Likewise, the proper angle ensures the fastener makes solid contact with the deck board and underlying joist or structure. In addition, the clip magazine can advantageously hold both single-sided clips and fasteners. The clip magazine can be configured to align a fastener with a clip, and provide an exit port that enables a user to insert a tool to drive the fastener down through a single-sided clip, and into a side of the deck board. Thus, the clip magazine allows multiple clips to be installed at an identical height, and without the inefficiencies of systems that keep fasteners and clips separate prior to deck board installation.

Single-Sided Deck Clip System

Now turning to the Figures, FIGS. 1A-2B illustrate various examples of single-sided deck clip configurations, in accordance with some embodiments disclosed herein. In particular, FIG. 1A illustrates a perspective view of a single-sided clip 100A in accordance with an embodiment of the present disclosure. The single-sided clip 100A can include a flat vertical clip body 102. Also shown, a front-side 118 of the clip body 102 can include a formed area 104, a pass-through, or fastener hole 106, a top portion 108, one or more horizontal portions 110, and one or more spacer portions 112. The exact diameters of the fastener hole 106 can vary, depending on a desired configuration. For example, the fastener hole 106 can comprise a diameter of at least 0.032 inches to allow insertion of, for example, #10 screw-type fasteners. However, other fastener types and widths are within the scope of this disclosure, and the specific examples provided herein are not intended to be limiting.

In an embodiment, such as the embodiment shown in FIG. 1A, the fastener hole 106 can include a non-circular opening that enables insertion of fasteners at multiple angles. Some such example angles include 0 to 180 degrees, relative to the clip body 102. This flexibility can enable a user to insert a fastener through the fastener hole 106 without necessarily being limited to a particular angle of insertion, or a particular fastener width. In one embodiment, the fastener hole 106 is in a so-called "self-drilling" configuration that guides a screw to a particular angle based on the configuration of the formed area 104 and the fastener hole 106.

Figure 3:
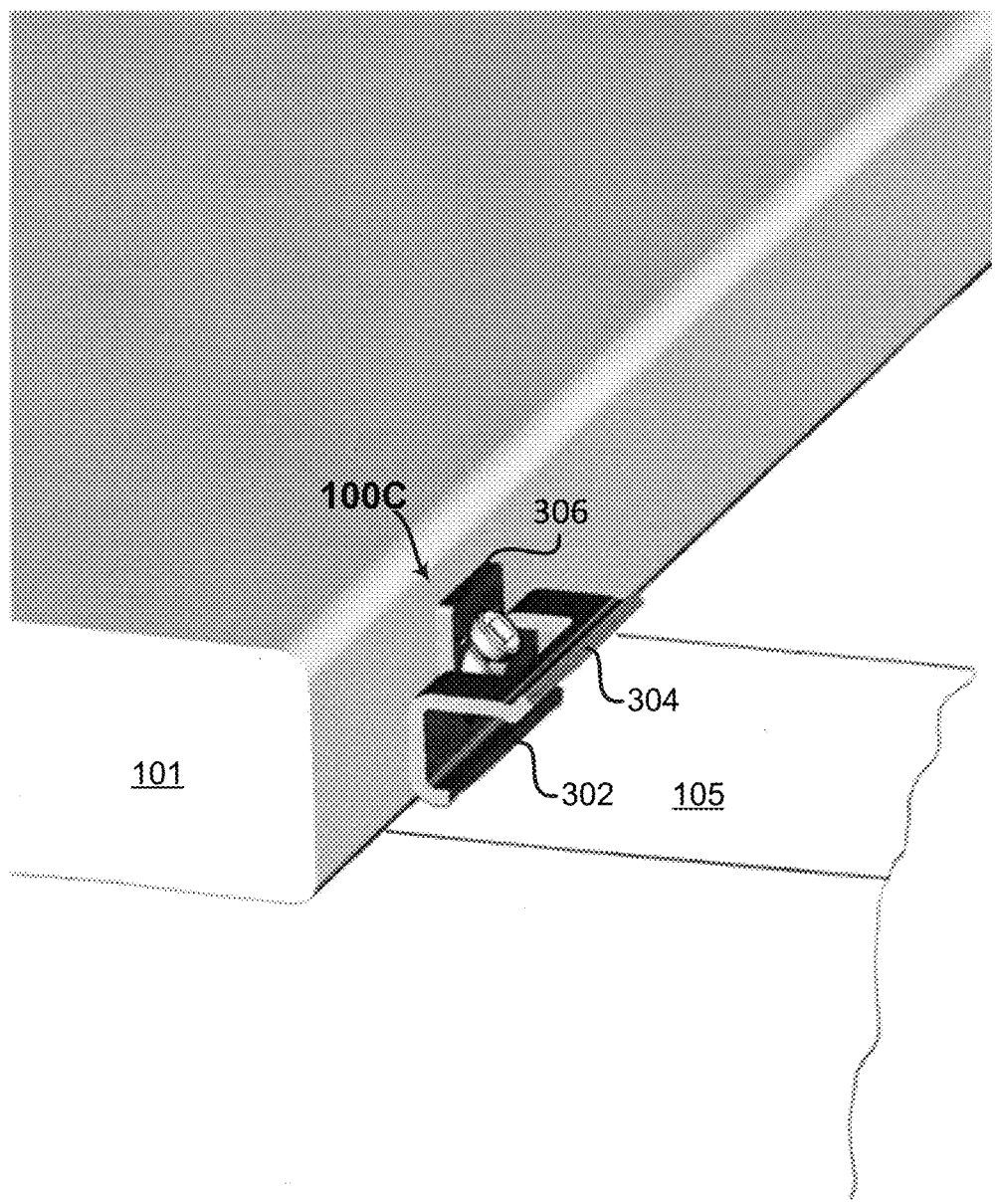
FIG. 3 is a perspective view of another example a single-sided clip, in accordance with an embodiment of the present disclosure.
Figure 5:
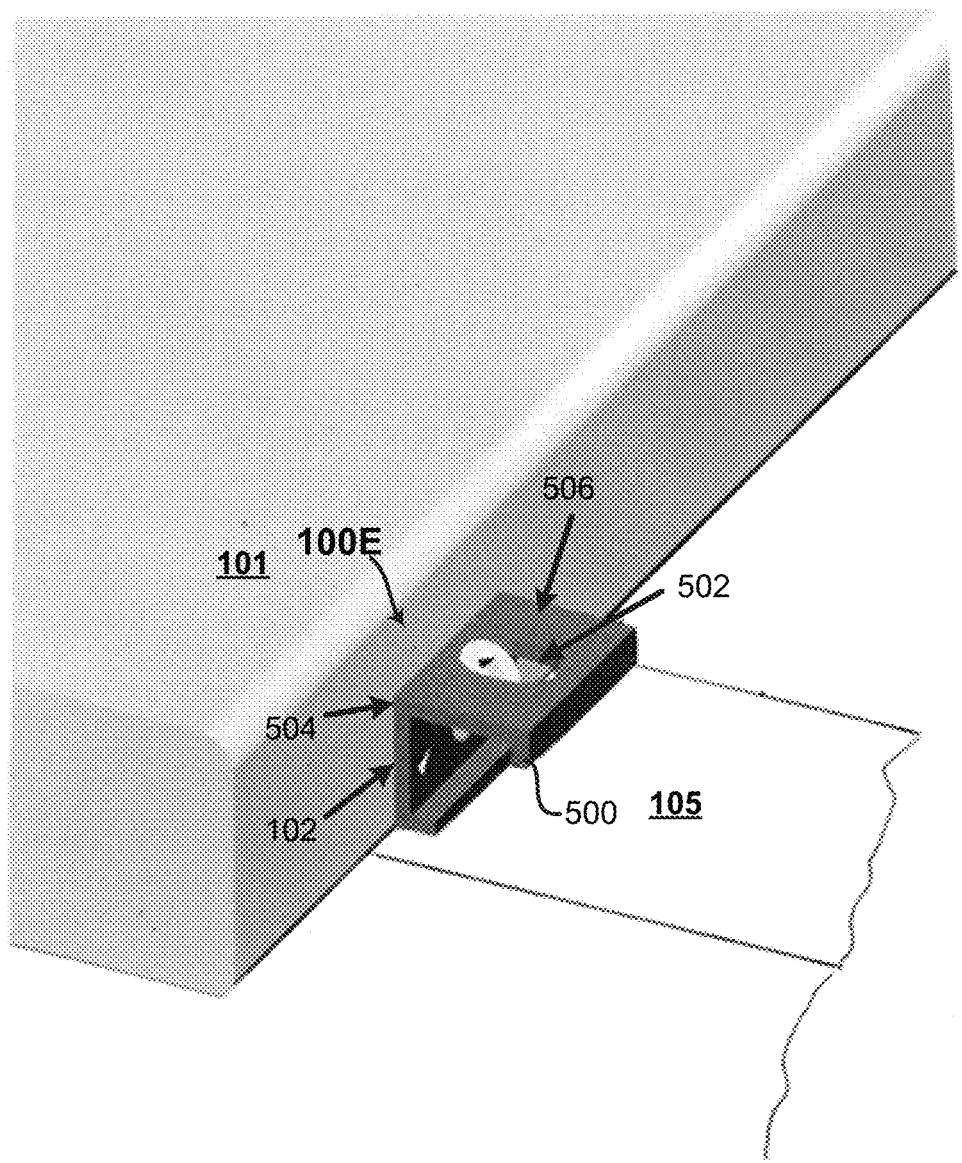
FIG. 5 is a perspective view of yet still another example of a single-sided clip, in accordance with an embodiment of the present disclosure.

The top portion 108 adjacent the formed area 104 can include a substantially rounded shape, as shown in FIG. 1A, or include a different shape such as shown in FIGS. 3 and 5, for example. The formed area 104 can support a head of a fastener, such as a screw head, after insertion of a fastener through the fastener hole 106. One such example of this is illustrated below with regard to FIG. 1B. Some examples of fasteners that can attach the single-sided clip 100A to a deck board and underlying joist include, for example, a screw or non-screw, such as a nail or staple. Fasteners can comprise metal or other rigid material suitable for penetrating deck boards. For instance, stainless steel screws can provide structural support and resistance to corrosion and rusting. These screws may include T-20 star drive heads, or other standard drive heads. Fastener lengths can vary and measure, for example, ¼ inch to 4 inches. However, other fastener lengths are also within the scope of this disclosure.

As shown, the front-side 118 of the single-sided clip 100A may include horizontal portions 110 that extend from the clip body 102 from a proximal end 109 to a distal end 111, and form flanges. The flanges can comprise a uniform thickness, or taper at the distal end 111. Each flange can generally include a first surface, an opposing second surface, and at least one side circumscribing at least a portion of the first and second surfaces. The first surface and the second surface may be generally planar, and the first planar surface may be generally parallel to the second planar surface.

Figure 4:
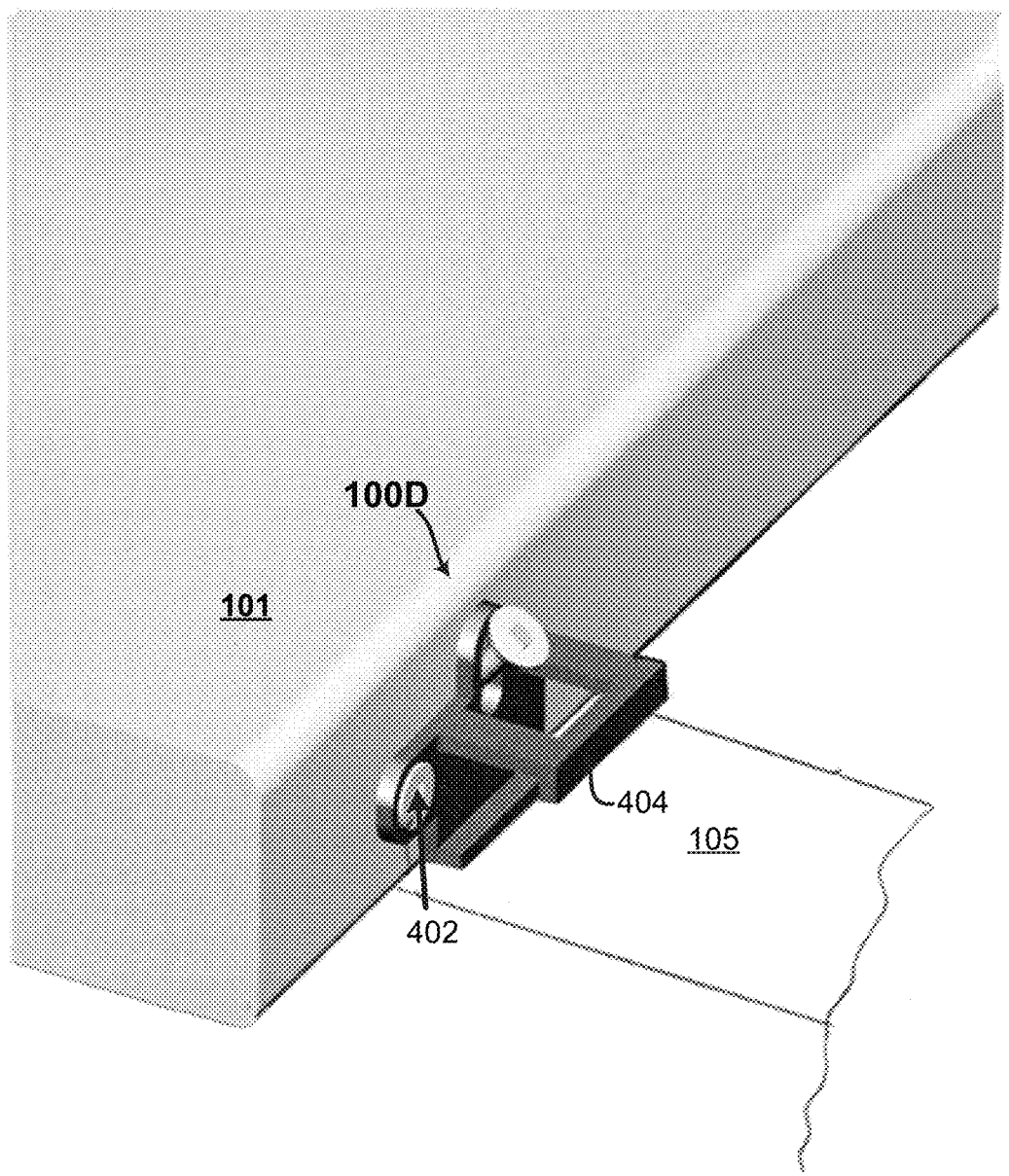
FIG. 4 is a perspective view of yet another example of a single-sided clip, in accordance with an embodiment of the present disclosure.

As discussed below, the flanges enable at least partial insertion into a pre-formed slot or groove within deck boards. The horizontal portions 110 can comprise multiple flanges, such as the embodiment shown in FIG. 1A, or a single flange configuration, such as shown in FIGS. 3-5. The horizontal portions 110 can include a rounded portion 114, or other shape. The rounded portion 114 can function as a guide, and allow insertion of the single-sided clip 100A into a deck board groove, without snagging or otherwise or biting into a deck board. The angle each flange extends from the single-sided clip 100A can vary, but can be approximately 90 degrees (e.g., perpendicular) or less relative to the clip body 102, depending on a desired configuration. This enables the flanges to flex slightly downwards after fastening the single-sided clip 100A to a joist or underlying structure. The downward flex can increase force against a deck board and provide a spring-like effect to grip deck boards as discussed further below. Note that the flanges can form round and non-round shapes at distal end 111. Moreover, the flanges may include other means for applying downward pressure such as barbs, teeth, half-rounds, ribs, and other such features.

The front-side 118 of the clip body 102 can further include one or more spacer portions 112. The one or more spacer portions 112 can extend perpendicular to the clip body 102, and provide a built-in buffer or spacer between deck boards positioned on opposite sides of the single-sided clip 100A. As shown, the spacer portions 112 extend to a distance less than the distance that the horizontal portions 110 extend outwardly from the clip body 102. In some embodiments, the single-sided clip 100A can provide spacing through other features located on the clip body 102. One such example is illustrated below with regard to FIG. 1B, and shows the formed area 104 also providing spacing between deck boards 101 and 103. As shown in FIGS. 3-5, the one or more spacer portions 112 can comprise a single spacer that extends the length 120 of the single-sided clip 100A, or at least a portion thereof. While scenarios discussed herein include the spacer portions 112 extending from the clip body 102 of the single-sided clip 100A at approximately a 90 degree angle, other angles are also within the scope of this disclosure.

A back-side 116 of the clip body 102 can include barbs, spurs, ribs, spikes, or other such raised features to "bite" into deck boards during installation of the single-sided clip 100A. For example, barbs 126 shown in FIG. 1B can provide a suitable sharpness to secure the single-sided clip 100A to the deck board 101 during installation. Barbs 126 can project outwardly from the back-side 116 of the clip body 102. For example, the barbs 126 can include shaped ends formed by outward projections that enable the barbs 126 to penetrate deck boards, thus acting like a nail. This can reduce the amount of movement while driving a fastener through the board 101, and the underlying joist 105 during installation.

The back-side 116 may include barb-like features across the entire length 120 of the single-sided clip 100A, or alternatively, include such features at a limited number of locations. For example, the back-side 116 located along the top portion 108 can include the barb features, while the remaining portion of the back-side 116 does not. One such example of this embodiment is discussed below with reference to FIG. 1B. In some embodiments, the entirety of the back-side 116 can feature a smooth or relatively flat texture.

The height 122 of the single-sided clip 100A can vary from ¼ inch to 4 inches, for example, but other heights are also within the scope of this disclosure. Likewise, the length 120 of the single-sided clip 100A can vary from ¼ inch to 4 inches, for example, but other lengths are also within the scope of this disclosure. The thickness 125 of the single-sided clip 100A may also vary, depending on a desired application. For instance, a 1/16 inch thickness 125 may provide suitable strength for some surfaces such as deck trim or stair trim. However, for structural support in areas meant to support people, a thicker profile can be appropriate.

In some cases, the single-sided clip 100A comprises SAE 304 stainless steel, also known as A2 stainless steel. In other cases, the single-sided clip 100A comprises another type of steel, or a different type of metal, such as aluminum, chrome, tin, and zinc, or any suitable metal or alloy thereof. Note that the single-sided clip 100A is not necessarily limited to a metal construction. For example, the single-sided clip 100 can comprise a plastic or other rigid non-metallic material such as rubber, for example. Moreover, a first portion of the single-sided clip 100A can comprise a metallic material while a second portion can comprise a non-metallic material. For example, the clip body 102 can comprise a metal material while the formed area 104 may comprise a non-metallic material. In another example, the clip body 102 can comprise a first metal material while the formed area 104 can comprise a second metal material. Numerous other permutations and variations will be apparent in light of this disclosure. In some cases, the fastener hole 106 may not necessarily be pre-drilled/exposed, and may require insertion of a fastener through the material of the formed area 104 to expose an aperture. This advantageously ensures that the aperture is sized substantially to the width of the fastener.

In an embodiment, formation of the single-sided clip 100A includes die-stamping of stainless steel or other metal. In other embodiments, formation of the single-sided clip 100A includes injection molding for plastic, rubber, or other non-metallic material. In any such embodiments, the various portions of the clip body 102 (e.g., the horizontal portions 110, spacer portions 112, formed area 104, and so on) may be integrally formed, or may comprise separate pieces secured to the clip body 102 by any appropriate means. Such means can include, for example, fastener(s), adhesive, welding, and interlocking portions, just to name a few.

Figure 1B:
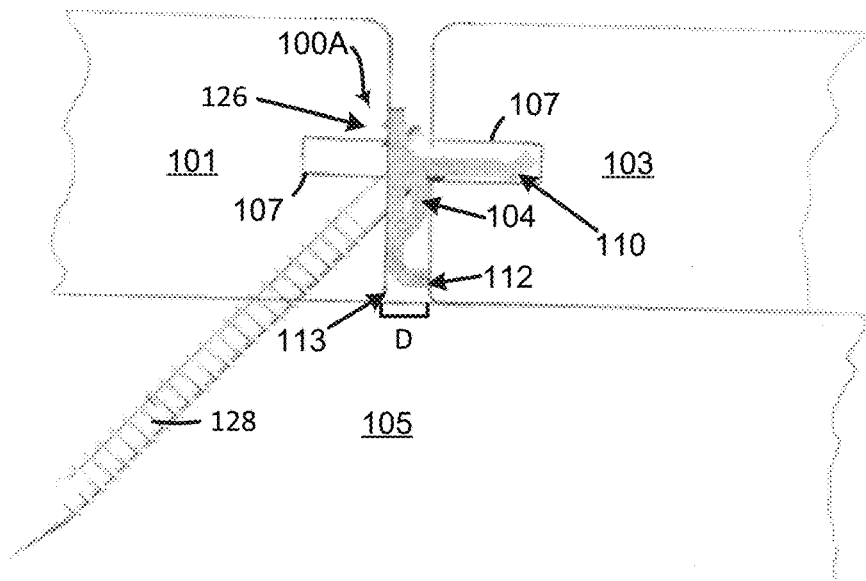
FIG. 1B illustrates a perspective view of the single-sided clip attached to a deck board and an underlying joist via a fastener, in accordance with an embodiment of the present disclosure.

Now referring to FIG. 1B, a perspective view of the single-sided clip 100A is shown attached to a deck board 101 and an underlying joist 105, in accordance with an embodiment of the present disclosure. As shown, a screw-type fastener 128 inserted through the fastener hole 106 penetrates the deck board 101 and the joist 105. Note that deck boards 101 and 103 may comprise wood material (e.g., hardwoods), composite materials, synthetic resins, or any other material suitable for decking. Each deck board 101 and 103 includes at least one pre-grooved or biscuit jointer slot 107. Depending on the manufacturer of the deck board, the groove position and profile can vary. For instance, some manufactures provide slot 107 between ⅜ inches to ⁵⁄₁₆ inches from the bottom of the deck board. In addition, the manufacturing specifics for the slot 107 profile can vary, but are generally ⅛ inch to ¼ inch tall (from top to bottom), and approximately ½ inch deep (from left to right). It should be appreciated in light of this disclosure that other slot profiles are also within the scope of this disclosure.

Although the embodiment shown includes the slot 107 having a relatively flat profile (e.g., running parallel with the joist 105), in some embodiments the slot 107 is angled to allow water and other liquids to escape. This is generally referred to herein as a sloped bottom groove. This configuration can reduce corrosion of the single-sided clip 100A, and also reduce wood rot. In any such cases, the single-sided clip 100A, and other variations disclosed herein, may be used with straight slots, sloped bottom grooved slots, biscuit joint slots, pockets, or other slot-types. Thus the term slot, as generally referred to herein, is intended to encompass all variations and alternatives.

Continuing with FIG. 1B, the single-sided clip 100A includes optional barbs 126. The barbs 126 can enable an initial positioning of the single-sided clip 100A against the deck board 101 prior to insertion of the fastener 128, if desired. This can include, for example, using a punch against the formed area 104 to cause the barbs 126 to pierce a side of the deck board 101. The barbs 126 also enable the single-sided clip 100A to bite into the side of the board and prevent movement of the clip after insertion of a fastener.

In any event, positioning the fastener at an appropriate height/elevation allows the horizontal portions 110 of the single-sided deck clip to lineup with a slot 107 of the adjacent deck board 103. As discussed further below, and in accordance with an embodiment, a clip magazine also enables such alignment. In some cases, the single-sided deck clip 100A naturally aligns with the slot 107 of deck board 103 when, for example, the single-sided deck clip 100A rests on the underlying joist 105 and the height 122 of the single-sided deck clip 100A, and more particularly the height of the horizontal portion 110, falls within the slot 107 opening. While the single-sided clip 100A in FIG. 1B rests off of, or elevated from, the underlying joist 105, other embodiments include the single-sided clip 100A resting on the joist 105 (e.g., see FIG. 5).

In any event, note that the single-sided clip 100A mounts against the side of the deck board 101 without necessarily requiring interaction with a grooved edge of the deck board. To this end, and as shown, the single-sided clip 100A can securely fasten without interacting with groove 107 of the deck board 101 (e.g., via a horizontal portion 110 on the back-side 116 of the single-sided clip 100A). Thus, the deck board 101 can comprise a groove-less board, or alternatively, a deck board with a single groove. This advantageously provides a deck edging around a perimeter of a deck without an unsightly groove that would otherwise be visible if a double-grooved board was used. Such benefits also extend to other places in which deck board edges are visible including, for example, stair treads.

The installation of single-sided clip 100A includes driving the fastener 128 through the deck board 101 and into the joist 105 to provide a positive connection between the deck board 101 and the underlying frame. As discussed above, the head of the fastener 128 can rest on the formed area 104 of the single-sided clip 100A. As shown, a portion of the head of the fastener 128 advantageously resides within the slot 107 of deck board 103, after the horizontal portions 110 of the single-sided clip 100A get inserted into the deck board 103. This countersinking configuration means that the deck board 103 comes to a stop at the spacer portions 112 and formed area 104 of the single-sided clip 100A, without obstruction from the head of the fastener 128. As should be appreciated, this achieves a relatively small gap between boards, which can increase aesthetic appeal of a deck. Moreover, the gap between each deck board is no greater than the width of the spacer portions 112, thus hiding the single-sided clip 100A from view.

In more detail, the deck board 101 may be positioned a distance, D, from adjacent deck board 103, providing a gap 113 between deck board 101 and adjacent deck board 103. The gap 113 can allow liquids (e.g., water) to run off the deck boards. The distance D can vary based on the relative expansion and contraction of deck board 101, deck board 103, or both. The single-sided clip 100A can facilitate expansion and contraction of adjacent deck boards, as discussed herein. The spacing portions 112 can be configured to provide a nominal spacing between deck boards and form the gap 113. In an embodiment, the spacer portions 112 (as well as other features capable of providing a spacer such as formed area 104) may contact the edges of deck board 103. Such spacers may also be configured to penetrate the adjacent deck boards as the deck boards expand. For example, the spacer portions 112 can include a tapered distal end that forms a point or tip.

Figure 2A:
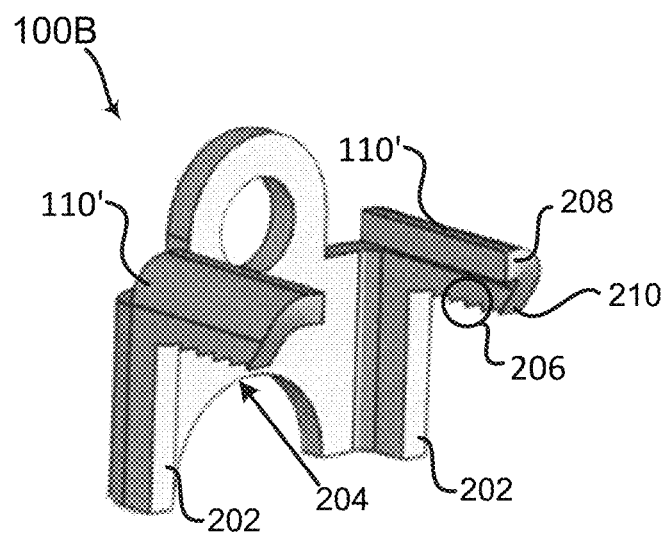
FIG. 2A is a perspective view of another example of a single-sided clip, in accordance with an embodiment of the present disclosure.
Figure 2B:
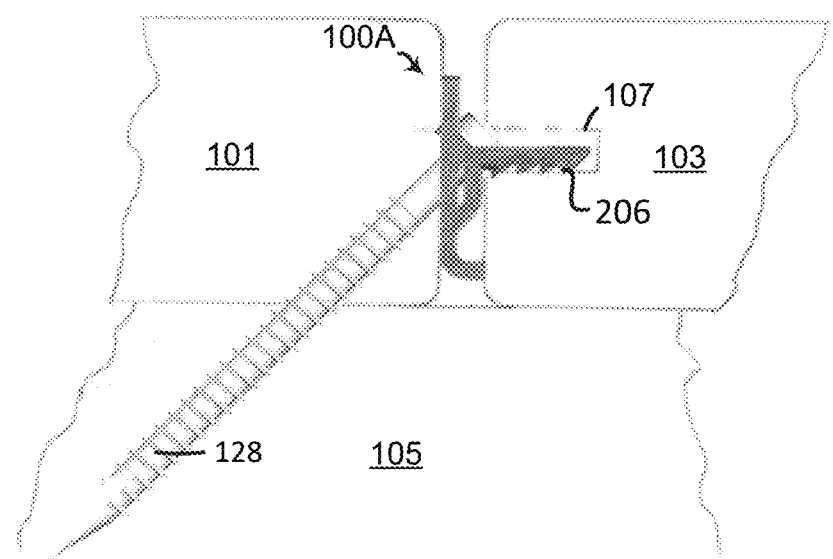
FIG. 2B, is a perspective view of another example of the single-sided clip of FIG. 1, including teeth along a bottom portion of the single-sided clip's horizontal portions, in accordance with an embodiment of the present disclosure.

Now referring to FIG. 2A, a perspective view of another embodiment of a single-sided clip 100B is shown. As shown, the single-sided clip 100B includes similar features to that of the single-sided clip 100A. However, the single-sided clip 100B further includes shaped horizontal portions 110', a recess forming a half round bottom back portion 204, and side spacers 202. The shaped horizontal portions 110' form a key-like shape which projects from a lower portion 210 upwards into a curved upper portion 208. The lower portion 210 may comprise teeth 206 or serrated edges. In some cases, such as the embodiment shown, the teeth 206 include a serration pattern along an entire length of the shaped horizontal portions 110'. In other cases, the shaped horizontal portions 110' include the serrations along only a portion of the lower portion 210, such as just at the end. As will be appreciated in light of this disclosure, the teeth 206 can provide enhanced gripping capabilities when inserted at least partially into deck board slots, such as slots 107 of FIG. 1B. Note that teeth 206 are not limited to merely the embodiment shown in FIG. 2A, and are equally applicable to the horizontal portions 110 of FIG. 1A, as well as other embodiments disclosed herein. For example, as shown in FIG. 2B, an alternative embodiment of the single-sided clip 100A includes teeth 206 configured to bite into or otherwise snag against the surface of the slot 107.

Referring now to FIG. 3, a perspective view of another embodiment a single-sided clip 100C is shown. The single-sided clip 100C is similar to that of single-sided clip 100A-B, except for a square top portion 306, a single horizontal portion 304, and single spacer portion 302.

Referring now to FIG. 4, a perspective view of another embodiment of a single-sided clip 100D is shown. The single-sided clip 100D is similar to that of the single-sided clip 100A-C, except for an additional fastener hole 402, and a single horizontal portion 404 with a downward-facing distal end (pointing towards the joist 105). In an embodiment, the additional fastener hole 402 allows insertion of another fastener to provide structural support through increased friction between the deck board 101 and the single-sided clip 100D. In some cases, the single horizontal portion 404 can include a barb at the distal end to bite into the surface of a deck board slot after insertion.

Referring now to FIG. 5, a perspective view of another embodiment of a single-sided clip 100E is shown. The single-sided clip 100E is similar to that of the single-sided clip 100D, except for a horizontal portion 506 extending from a top position 504 of the clip body 102. The horizontal portion 506 includes a fastener pass-through hole 502 to facilitate insertion of a fastener.

It should be appreciated in light of this disclosure that FIGS. 1A-5 illustrate only some of the possible configurations of the single-sided clip. Other configurations are possible, and are also within the scope of this disclosure. It will be further appreciated that combinations of features may also be implemented, within the scope of the present disclosure. Accordingly, the specific embodiments shown in FIGS. 1A-5, provided by way of illustrations, are not intended to be limiting.

Clip Magazine Apparatus

Figure 6A:
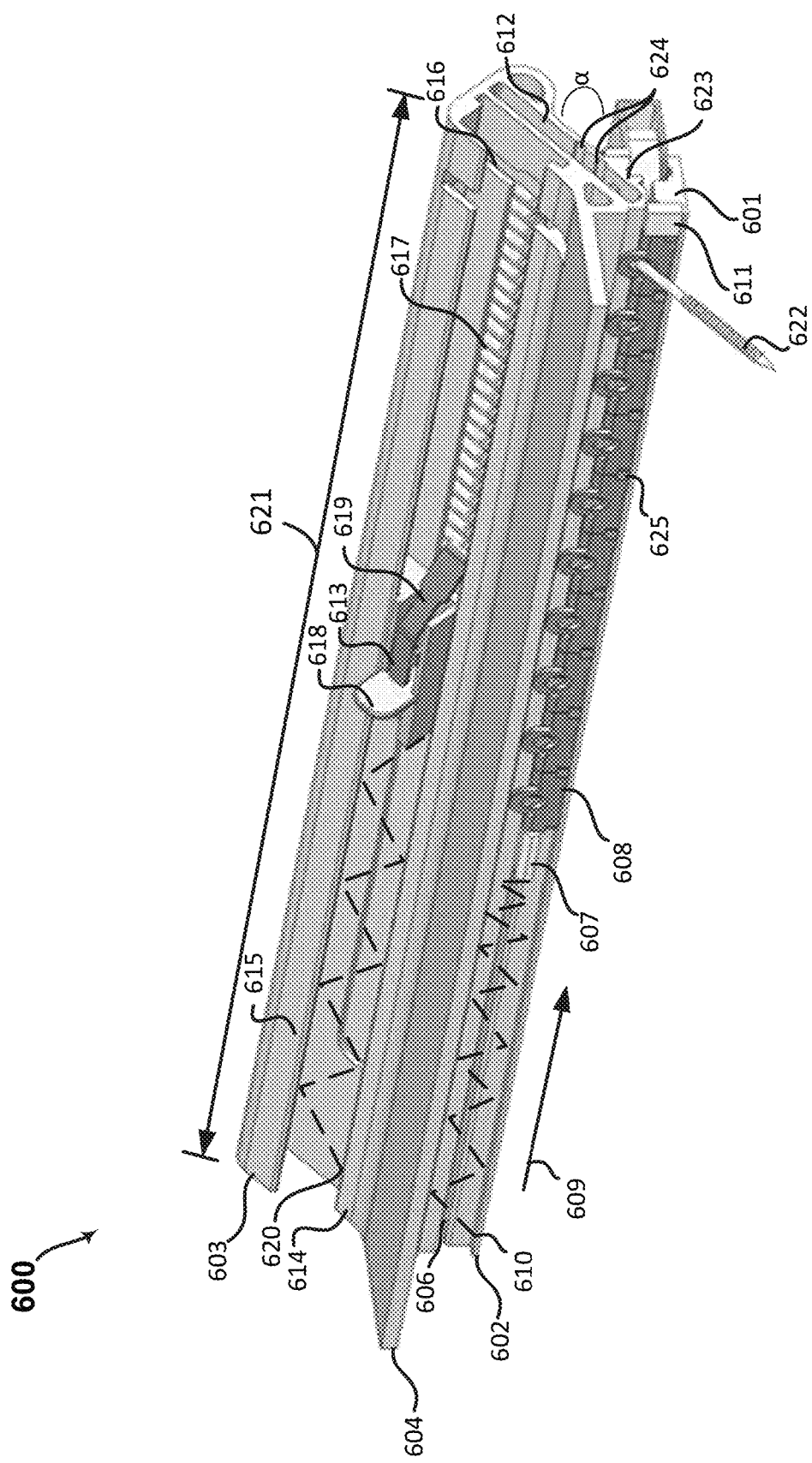
FIG. 6A is a perspective view of a clip magazine configured to store, supply, and install single-sided clips, in accordance with an embodiment of the present disclosure.

As previously discussed, some embodiments include using a clip magazine apparatus to elevate a single-sided clip during installation. One such example clip magazine 600 is shown in FIG. 6A. FIG. 6A is a perspective view of an example clip magazine 600 configured to store, supply, and install single-sided clips, in accordance with an embodiment of the present disclosure. The clip magazine 600 can assist in both elevated (e.g., as shown in FIG. 1A) and non-elevated installations of single-sided deck clips (e.g., as shown in FIG. 5). In any event, as can be seen, the clip magazine 600 comprises a magazine body 601, with the magazine body 601 including a lower portion 602, an upper portion 603, and a flange 604. Each of these portions run parallel to one another and generally extend to substantially the same length along length 621.

As shown, the lower portion 602 of the magazine body 601 is formed with a guide groove 606, and a clip feeder 607. Loading single-sided clips into the lower portion 602 includes a user inserting one or more clips 608 into the lower portion 602 by pushing a horizontal portion of each clip into guide groove 606. The guide groove 606 supports the one or more clips 608 and allows horizontal movement of the clips. In one embodiment, the configuration of the horizontal portions of each clip provides sufficient friction to keep the clips from slipping out of the guide groove 606. To this end, the guide groove 606 is configured to receive horizontal portions provided by the single-sided clips, and hold those clips in place.

In one embodiment, the lower portion 602 is adapted to receive single-sided deck clips, such as the single-sided deck clips 100A-100E discussed above with regard to FIGS. 1A-5. In some cases, the single-sided deck clips including a collating feature. In this case, collating can include one or more couplings between adjacent clips. Some such example couplings include stainless steel, welds, adhesives, tape, and coating materials (e.g., plastic), just to name a few. For example, and as shown in FIG. 6A, one or more welds 625 may couple the adjacent clips. In another example, coupling may result from manufacturing a plurality of clips. In this example, the plurality of clips may be stamped and the couplings may remain after the stamping process. In other cases, the deck clips are loose.

The couplings and/or coupling material are configured to collate the single-sided clips to facilitate delivery using a magazine, e.g., clip magazine 600. The couplings and/or coupling material are configured to break during fastening and/or to be broken after fastening a single-sided clip to the deck boards, joists, and underlying structures, as described herein.

The clip feeder 607 within the lower portion 602 can move horizontally along the guide groove 606 and provide force in direction 609 toward a stopper 611. In one embodiment, a spring 610 provides bias to the clip feeder 607 to supply force in direction 609. For instance, the spring 610 can comprise a spring steel or coil spring arrangement. In other embodiments, the clip feeder 607 uses manual force by a user, friction, magnets, air or other means to supply a force sufficient to push or otherwise hold the one or more clips against the stopper 611. In any such embodiment, the clip feeder 607 presses (e.g., under force by optional spring 610) against a clip nearest the clip feeder 607, which then presses adjacent clips toward the stopper 611.

As shown, the upper portion 603 of the magazine body 601 is formed with a fastener cavity 612, a fastener feeder 613, a pusher arm 619, a lower rail 614 or guide, an upper rail 615 or guide, collated coupling recesses 624, and an aligned exit shaft 616. Loading fasteners into the upper portion 603 of the magazine body 601 includes, optionally retracting the fastener feeder 613 as discussed below, and inserting the fasteners into the fastener cavity 612. The magazine body 601 can provide a view to a user of the number of fasteners loaded through an exposed fastener viewing port 617.

The fastener feeder 613 within the upper portion 603 can move horizontally along a path provided by the lower and upper rails 614 and 615. The fastener feeder 613 can also provide a force in direction 609, similar to that of the clip feeder 607. In one embodiment, a spring 620 can bias the fastener feeder 613 to supply such force. For instance, the spring 620 can comprise a spring steel or coil spring arrangement. In other embodiments, the fastener feeder 613 uses manual force by a user, friction, magnets, air or other means to supply a force sufficient to push or other hold fasteners against the stopper 611 of the magazine body 601. In any such embodiment, the fastener feeder 613 presses against a nearest fastener, which then urges adjacent fasteners toward the stopper 611. In an embodiment, the fastener recesses 624 provide a channel in which collated fastener couplings can extend into, thus allowing the fasteners to set substantially flat within the fastener cavity 612. In any event, fasteners can be held in the fastener cavity 612 by, for example, lips (not shown) that respectively hold the top and bottom portions of the fastener in place.

The clip magazine 600 can utilize any of the previously mentioned fastener types, and is particularly well suited for using screw and nail-type fasteners. However, other types of fasteners can be utilized and are within the scope of this disclosure. For example, upper portion 603 may provide staples suitable for use in securing clips against deck boards. The size of the fasteners can vary, and the fastener cavity 612 can be configured to hold long fasteners (e.g., 4 inches or greater), short fasteners (e.g., under 4 inches in length), or both.

As shown, the fastener feeder 613 includes a tab portion 618 allowing a user to retract the fastener feeder 613 during, for example, loading of fasteners. In this case, the fastener feeder 613 can be pulled back away from end 623, and can optionally engage a lock (not shown) that temporarily prevents the fastener feeder 613 from moving until loading of fasteners has completed.

As shown, the upper portion 603 is angled, at α, approximately 45 degrees relative to the lower portion. As should be appreciated in light of this disclosure, this enables insertion of fasteners at an angle that is suitable for securing a clip against a deck board, and forming a positive connection between the deck board and an underlying joist. In some cases, the angle can be greater or less than 45 degrees. This angle may be set during manufacturing, or user-configurable based on an adjustable mechanism provided to adjust the distance between a backside of the lower and upper portions 602 and 603.

Figure 9A:
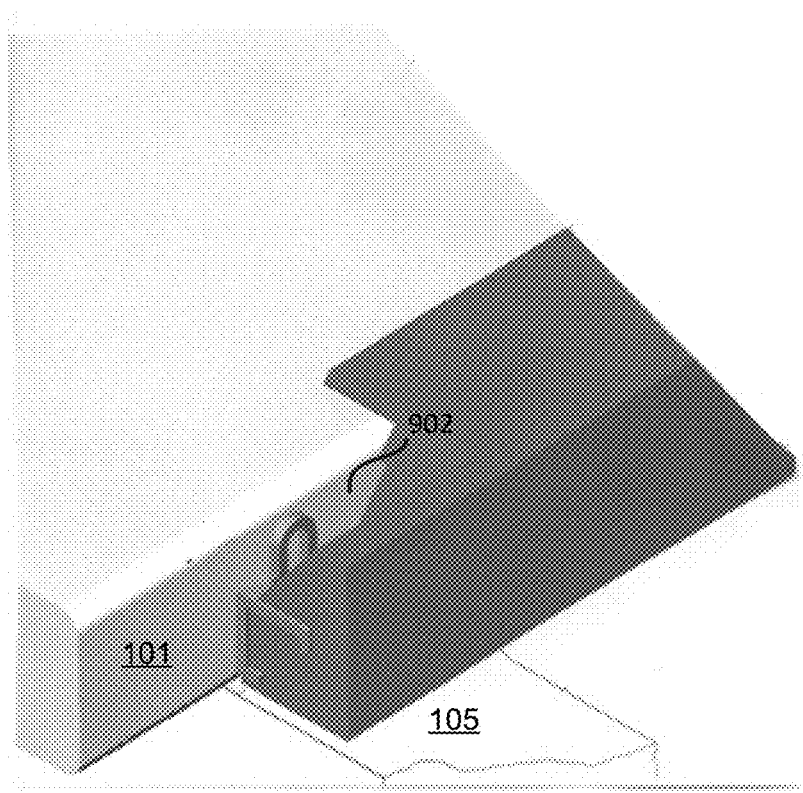
FIGS. 9A-9B collectively illustrate a perspective view of an example clip magazine, in accordance with an embodiment of the present disclosure.
Figure 9B:
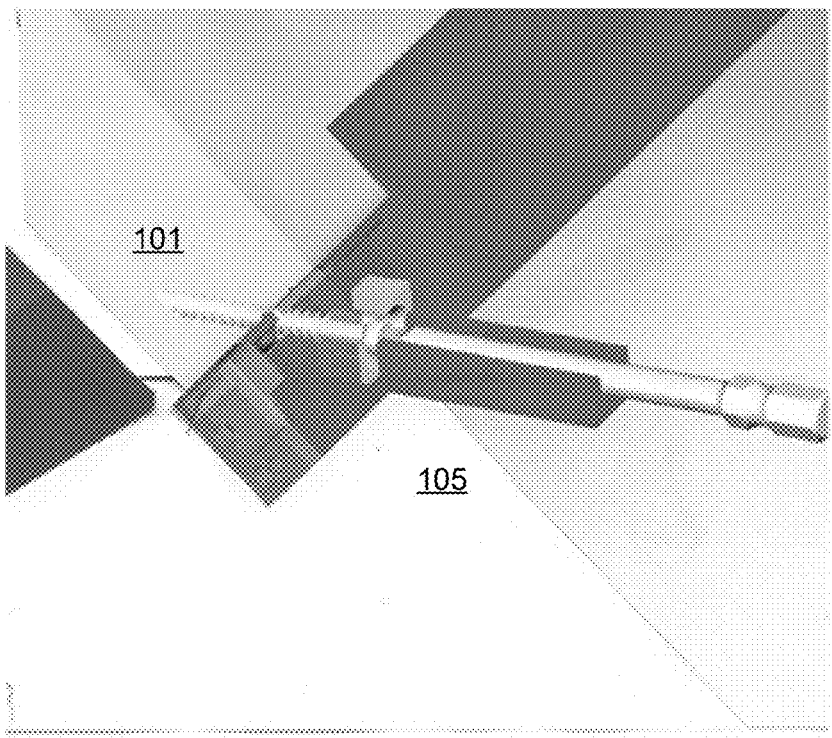

The lower and upper portions 602 and 603 can store multiple clips and fasteners along a length 621 of the magazine body 601. The clip feeder 607 and fastener feeder 613 urge clips and fasteners towards end 623, with the farthest position toward end 623 being an aligned exit shaft 616. The aligned exit shaft 616 allows a user to drive (or bias) a fastener through a fastener opening of an aligned clip, and through the side of a deck board and an underlying joist (e.g., such as shown in FIG. 1A). Such bias, or force, may be provided by a pneumatic, electrical, mechanical, or other appropriate means as will be appreciated in light of this disclosure. Bias may also be provided by manual force exerted by a user. Fastener 622 illustrates the path of the exit shaft 616 through the lower and upper portions 602 and 603 of the magazine body 601. The upper portion 603 can include an opening (not shown) that allows a tool, such as a drill driver, to contact the head of a fastener aligned with the exit shaft 616, and to drive the fastener into a deck board and underlying joist. One such example of such an opening is illustrated in FIGS. 9A-B.

Once a user fully pushes a fastener through the aligned exit shaft 616, and thus through an aligned clip's fastener opening, the aligned clip separates from the lower portion 602. In some cases, separation of the clip includes severing a sacrificial coupling between the aligned clip and an adjacent clip. For example, collated clips can include a weld 625 or other collating material discussed above. To this end, the severing of newly-attached clip can include a user pulling or otherwise moving the clip magazine 600 in a direction away from an installed single-sided clip.

Figure 6B:
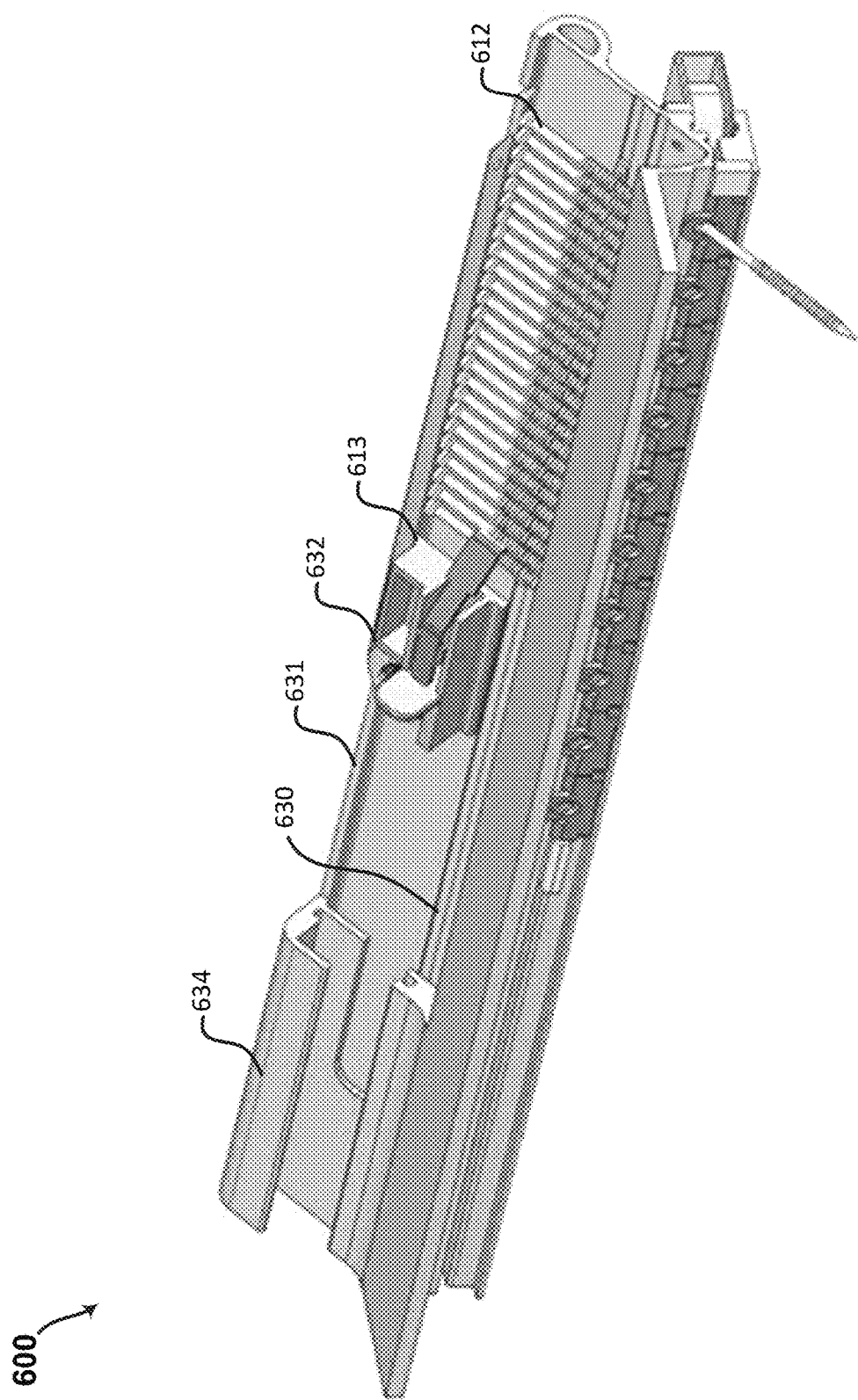
FIG. 6B is a perspective view of another example of the clip magazine of FIG. 6A, in accordance with an embodiment of the present disclosure.

FIG. 6B shows another embodiment of the clip magazine 600, in accordance with an embodiment of the present disclosure. As shown, the clip magazine 600 is similar to that of the clip magazine 600 of FIG. 6, except for an exposed fastener cavity 612, and an upper lip 631 and lower lip 630 that extends only a portion of the length of the clip magazine 600. Also as shown, an additional grip feature 634 is positioned at one end of the clip magazine 600. In some cases, the fastener feeder 613 includes a housing 632 that may contain a spring, such as a spring steel or coil spring arrangement (not shown).

Figure 6C:
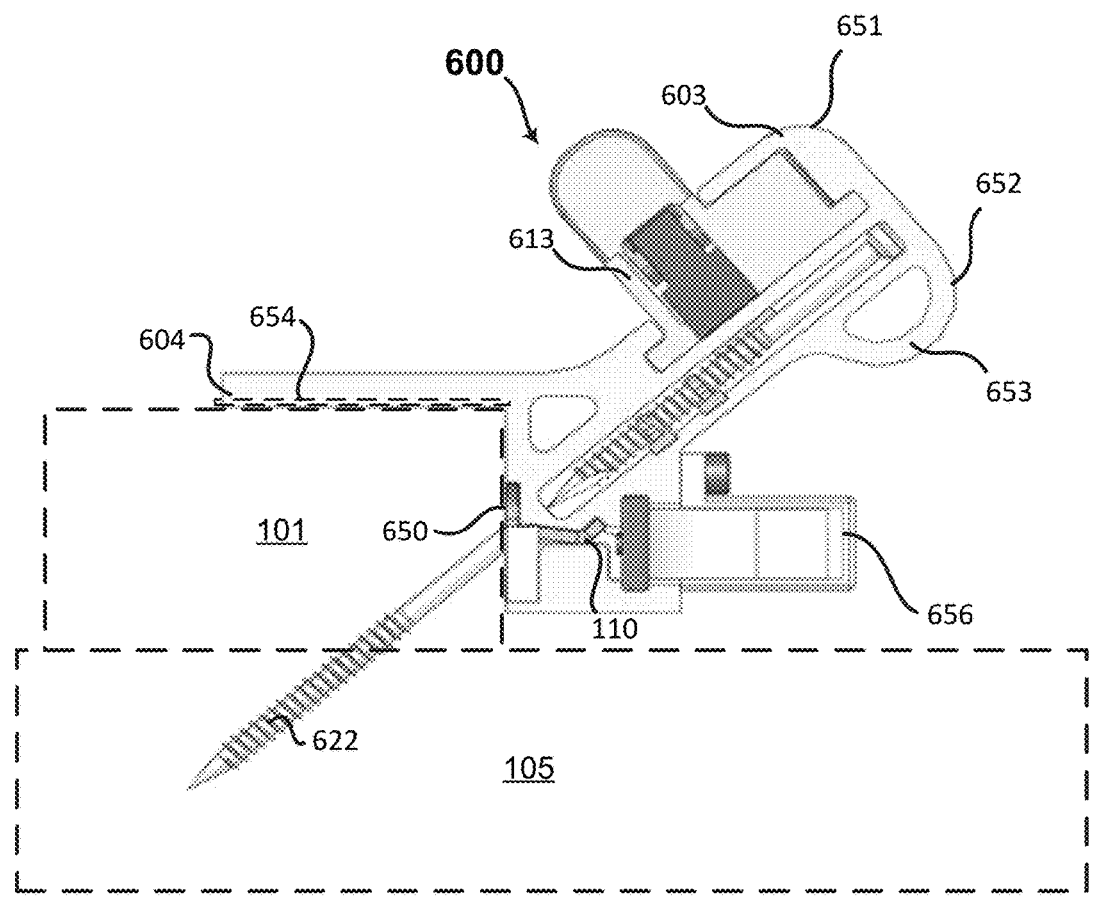
FIG. 6C is a cross-sectional view of the clip magazine of FIG. 6A, in accordance with an embodiment of the present disclosure.

FIG. 6C shows a cross-sectional view of the clip magazine 600 of FIGS. 6A and 6B in accordance with an embodiment, and positioned adjacent a deck board 101 and an underlying joist 105. As shown, the flange 604 allows a user to rest the clip magazine 600 on to a surface of the deck board 101. The upper portion 603 of the clip magazine 600 can include a top side 651 and a bottom side 652. The bottom side 652 can include rounded portion 653 configured to allow gripping of the clip magazine 600 by a user. In addition, the top side 651 and bottom side 652 allow a user to supply sufficient force to keep the clip magazine 600 flush against the deck board 101 while driving fastener 622 into the deck board 101 and underlying joist 105. In some cases, a user can apply foot pressure (e.g., via a boot or shoe) on to the surface of flange 604 during use.

The clip magazine 600 may comprise extruded aluminum, or other types of metal. In some cases, the clip magazine 600 may comprise a non-metallic material suitably rigid for use in deck board installation. In still other cases, the clip magazine can comprise both metallic and non-metallic materials.

As should be appreciated in light of this disclosure, the clip magazine 600 ensures that the height (or elevation) of clip 650 after installation allows the horizontal portions 110 to properly align with the groove of an adjacent deck board. In an embodiment, and as shown, the clip magazine 600 defaults to a particular elevation governed by the particular configuration of the clip magazine 600. In other embodiments, the clip magazine 600 allows the elevation of the clip to be user configurable. For instance, the clip magazine 600 may include an optional removable wear plate 654. The removable wear plate 654 can include different thicknesses that adjust the elevation of clip 650. Such adjustment can include adding as little as 1/16 inches of elevation up to several inches, depending on a desired elevation. The removable wear plate 654 can comprise metallic, or non-metallic materials, or both. In an embodiment, the clip magazine 600 includes a spring housing 656, which houses the spring associated with the clip feeder 607 discussed above.

Figure 7:
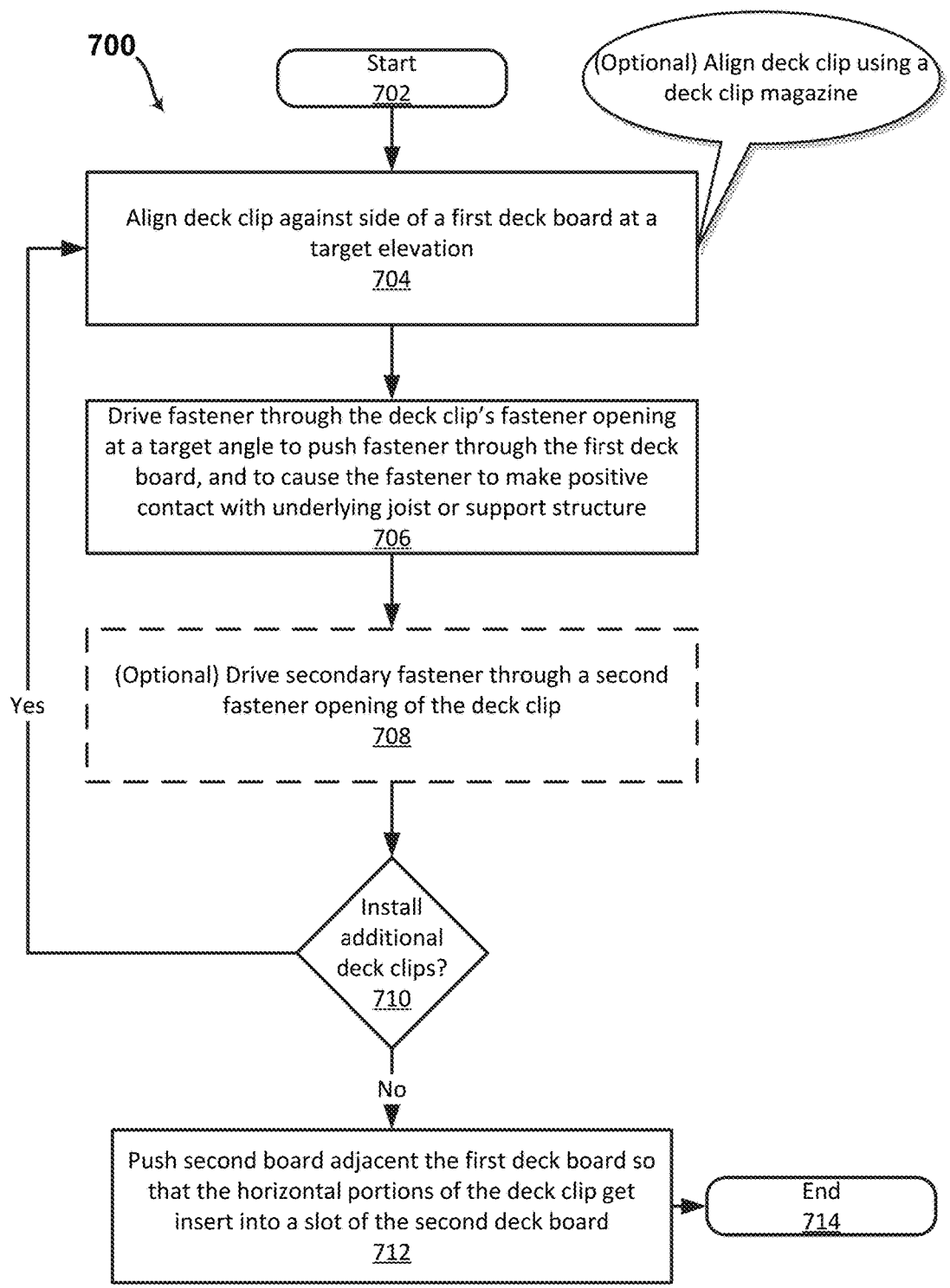
FIG. 7 shows an example method for installing deck boards using a single-sided deck clip, in accordance with an embodiment of the present disclosure.

FIG. 7 shows an example method for 700 installing deck boards using single-sided deck clips, in accordance with an embodiment of the present disclosure. Example method 700 begins in act 702.

In act 704, a user aligns a deck clip against a side of a first deck board at a target elevation. The target elevation is such that a horizontal portion extending perpendicular from one side of the single-sided deck clip can be inserted into a groove of an adjacent board. In one embodiment, the single-sided deck clip is aligned through a deck clip magazine that allows a user to position the deck clip at the target elevation. One such example deck clip magazine is discussed above with reference to FIGS. 6A-6C.

In act 706, the user drives a fastener through a pass-through hole 106 or fastener opening of the single-sided deck clip, and into the side of the deck board and underlying joist. The user drives the fastener until the fastener is tight against the single-sided deck clip. In an embodiment, the fastener is substantially countersunk into a formed area 104 once the fastener is fully tightened. In some cases, the user drives the fastener through the pass-through hole 106 at a 90 degree angle relative to an underlying joist. In other cases, the user uses a different angle to drive the fastener. In any event, this causes the fastener to penetrate a deck board and also an underlying joist or structure, thus creating a positive connection. One such example of a fastener driven through a single-sided deck clip and through a deck board and underlying joist is shown in FIG. 1B.

As discussed above, act 706 can be performed optionally using a clip magazine, such as clip magazine 600. This can include a user inserting a tool into an aligned exit shaft 616 and pushing a fastener out through the aligned exit shaft 616. As a result, the single-sided clip can be attached to the deck board. In some cases, a sacrificial coupling between the attached single-sided clip and an adjacent clip within the clip magazine is severed once a fastener is fully tightened against a deck board.

In act 708, the user can optionally drive a secondary fastener through a second fastener opening of the single-sided deck clip to provide additional structural support. One such example of a fastener driven through a secondary fastener opening is shown in FIG. 4.

In act 710, the user can install additional deck clips along the first deck board. When installing additional deck clips, acts 704-708 are repeated. Otherwise, the method continues to act 710. Note that when using a clip magazine during acts 704 and 706, the clip magazine can provide the additional clips and fasteners such that the user need not reload or otherwise interrupt installation to acquire clips and fasteners.

In act 712, the user places a second board adjacent the first deck board such that the horizontal portions of the one or more deck clips installed during acts 704-710 get inserted at least partially into a slot of the second deck board. The particular gap formed between the first and second deck board is not particularly relevant at this stage, so long as the horizontal portions 110 of each of the deck clips get inserted into the slot. In some cases, the horizontal portions 110 include a rounded portion allowing them to be easily inserted into deck board slots. The horizontal portions 110 can provide a spring-like effect that applies a downward force, once inserted into the slot of the second board. In other cases, the horizontal portions 110 include a serrated edge that allows the teeth to bite into the second board to better grip the second board and resist movement between the first and second boards.

In any event, the user can adjust the gap between the first and second boards such that the second board stops at a distal end of the spacer portions 112 of each installed deck clip, or at a position short of the distal ends of the spacer portions 112. The user can use a mallet to perform this adjustment, or use the clip magazine to push the second deck board until the spacer portions 112 make contact with a wall of a deck board slot.

Acts 704-712 may be repeated for additional deck boards until the deck or other structure is completed. Method 700 ends in act 714.

Figure 8:
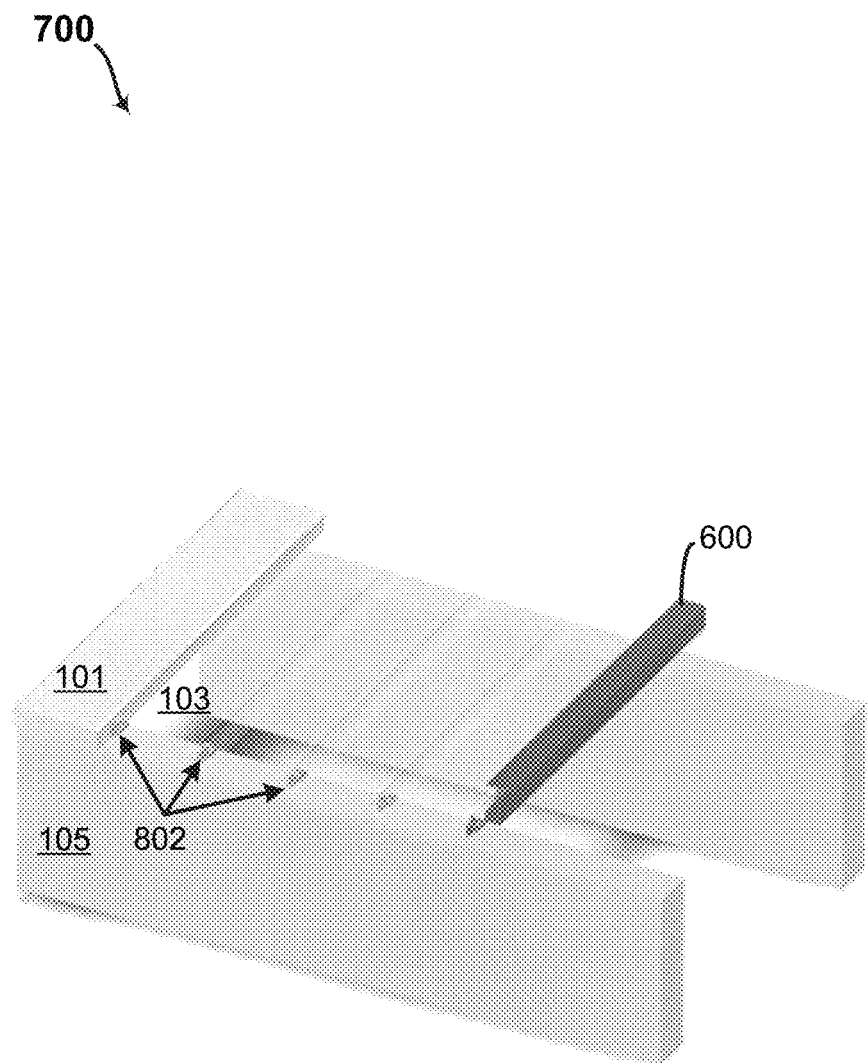
FIG. 8 illustrates an example deck structure resulting from performance of the method of FIG. 7.

FIG. 8 illustrates one example resulting deck structure built in accordance with method 700. As shown, deck clip 802 is attached via a fastener along a side of the deck board 101. An adjacent deck board 103 (shown translucent) receives a horizontal portion of single-sided deck clips 802 in a grooved opening along the length of deck board 103. The opposite side of the adjacent deck board 103 includes another deck clip 802 attached via a fastener. This configuration repeats, as shown. A simplified clip magazine 600 illustrates how a flange 604 of the clip magazine 600 rests against a deck board during installation of a deck clip.

FIGS. 9A-9B collectively illustrate how the simplified magazine 600 of FIG. 8 allows a fastener to be driven at a target angle and elevation. As shown, FIG. 9A shows a perspective view of the clip magazine 600 with a cutaway section 902, with the cutaway section 902 configured at an angle to allow access of the attaching fastener at a desired angle. One or more holding guides 801 can further enhance installation at the desired angle, as shown in FIG. 9B. These features of the simplified magazine 600 are equally applicable to the clip magazine 600 of FIG. 6A.

Figure 10A:
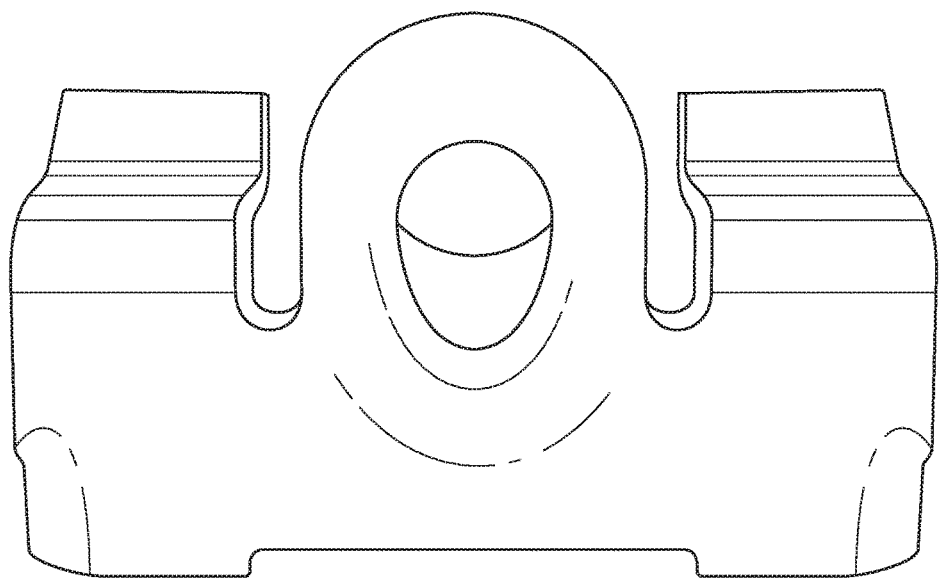
FIGS. 10A-10B are perspective views of an example single-sided clip, in accordance with an embodiment of the present disclosure.
Figure 10B:
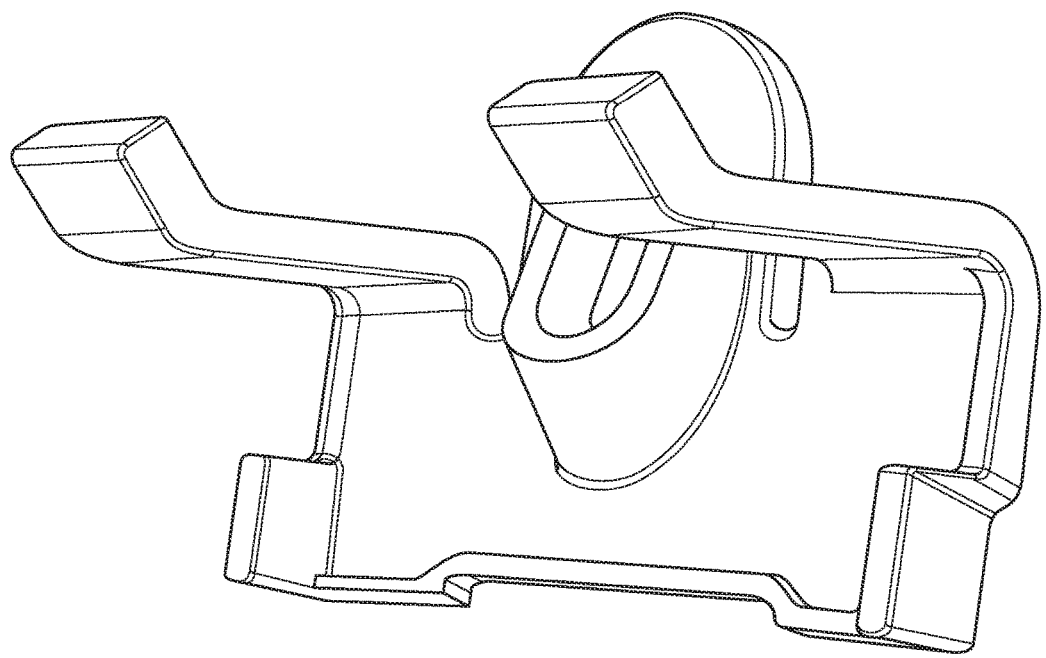

Turning now to FIGS. 10A-10B, there are perspective views of an example single-sided clip, in accordance with an embodiment of the present disclosure.

Figure 11A:
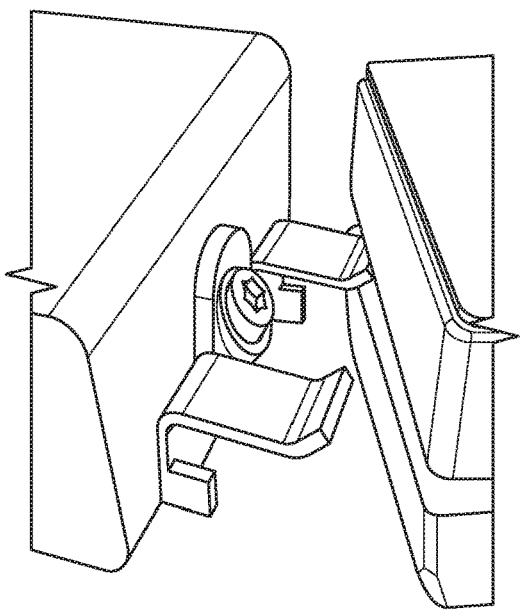
FIGS. 11A-11B are additional perspectives views the single-sided clip of FIGS. 10A-10B, in accordance with an embodiment of the present disclosure.
Figure 11B:
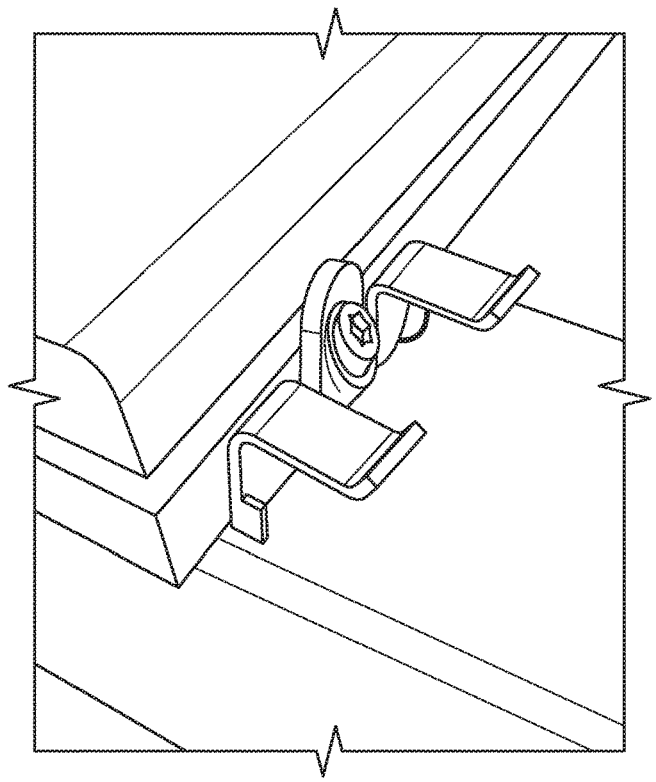

Turning now to FIGS. 11A-11B, there are perspectives views of yet another example single-sided clip, in accordance with an embodiment of the present disclosure.

In one aspect of the present disclosure there is provided a clip for fastening a deck board to a structure. The clip includes a body portion having a front side and a back side, the back side configured to rest against a side surface of the deck board; at least one horizontal portion extending outwardly from the front side of the body portion and configured to enter a groove of an adjacent deck board; and an opening in the body portion for receiving a fastener, the opening configured to allow the fastener to pass through the body portion and into the deck board.

In another aspect of the present disclosure, there is provided a clip for fastening a deck board to a structure. The clip includes a body portion having a front side and a back side, the back side configured to rest against a side surface of the deck board; at least one horizontal portion extending outwardly from the front side of the body portion to a distal end, and configured to enter a groove of an adjacent deck board, the distal end including a rounded portion; and an opening in the body portion for receiving a fastener, the opening configured to allow a fastener to pass-through the body portion and into the deck board and a joist.

In another aspect of the present disclosure, there is provided an apparatus comprising a magazine body configured to receive and hold at least one single-sided clip and at least one fastener. The magazine body includes a lower portion comprising a groove guide configured to hold the at least one single-sided clip; an upper portion comprising a fastener cavity configured to hold the at least one fastener; and an aligned exit shaft configured to align the at least one single-sided clip and the at least one fastener, the aligned exit shaft including an opening configured to allow insertion of a tool to make contact with a head of the at least one fastener.

According to one aspect consistent with the present disclosure, there is provided a clip for fastening a deck board to a structure is disclosed. The clip includes a body portion having a front side and a back side, the back side configured to rest against a side surface of the deck board, at least one horizontal portion extending outwardly from the front side of the body portion and configured to enter a groove of an adjacent deck board, and an opening in the body portion for receiving a fastener, the opening configured to allow the fastener to pass through the body portion and into the deck board. The at least one horizontal portion may comprise a plurality of horizontal portions. The at least one horizontal portion may comprise a single horizontal portion extending across the length of the body portion. The at least one horizontal portion may comprise at least one barb formed on a bottom surface thereof. The at least one horizontal portion may comprise teeth along a bottom edge of the horizontal portion. The at least one horizontal portion may comprise a rounded shape at a distal end.

The clip may further comprise an additional opening in the body portion for receiving an additional fastener. The clip may yet further comprise at least one spacer portion extending outwardly from the front side of the body portion to a distance less than the distance that the at least one horizontal portion extends outwardly from the body portion. The body portion may further comprise at least one barb on the back side for engaging the side surface of the deck board. The deck board may be above a joist, and wherein the opening is further configured to allow the fastener to pass through the body portion and into the deck board and the joist. The body portion can include a formed area allowing a head of the fastener to be substantially countersunk into the body portion. The clip can further comprise a collating feature configured for collating a plurality of clips.

According to another aspect consistent with the present disclosure, there is provided a clip for fastening a deck board to a structure. The clip includes a body portion having a front side and a back side, the back side configured to rest against a side surface of the deck board; at least one horizontal portion extending outwardly from the front side of the body portion to a distal end, and configured to enter a groove of an adjacent deck board, the distal end including a rounded portion, and an opening in the body portion for receiving a fastener, the opening configured to allow a fastener to pass-through the body portion and into the deck board and a joist. The clip can comprise at least one of a metallic material and a non-metallic material. The at least one horizontal portion can extend outwardly from the front side of the body portion at angle between 90 degrees and 30 degrees.

According to yet still another aspect consistent with the present disclosure, there is provided an apparatus provided. The apparatus includes a magazine body configured to receive and hold at least one single-sided clip and at least one fastener, the magazine body comprising a lower portion comprising a groove guide configured to hold the at least one single-sided clip, an upper portion comprising a fastener cavity configured to hold the at least one fastener, and an aligned exit shaft configured to align the at least one single-sided clip and the at least one fastener, the aligned exit shaft including an opening configured to allow insertion of a tool to make contact with a head of the at least one fastener. The magazine body can further include a flange extending outwardly from a front side of the magazine body and configured to rest on a surface of an adjacent deck board for delivery of the at least one single-sided clip and the at least one fastener. The at least one of the at least one single-sided clip and the at least one fastener may be collated. The at least one of the least one single-sided clip and the at least one fastener may be loose within the magazine body. The magazine body may further comprise a handle feature.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. An apparatus comprising:
    a magazine body configured to receive and hold at least one single-sided clip and at least one fastener, the magazine body comprising:
        a lower portion comprising a groove guide configured to hold the at least one single-sided clip adjacent a vertical surface of a deck board;
        an upper portion comprising a fastener cavity configured to hold the at least one fastener; and
        an aligned exit shaft configured to align the at least one single-sided clip and the at least one fastener, the aligned exit shaft including an opening configured to allow insertion of a tool to make contact with a head of the at least one fastener to force the at least one fastener through the at least one single-sided clip and through the vertical surface of the deck board and into an underlying structure.

2. The apparatus of claim 1, wherein the magazine body further includes a flange extending outwardly from a front side of the magazine body and configured to rest on a surface of an adjacent deck board for delivery of the at least one single-sided clip and the at least one fastener.

3. The apparatus of claim 1, wherein at least one of the at least one single-sided clip and the at least one fastener are collated.

4. The apparatus of claim 1, wherein the at least one of the least one single-sided clip and the at least one fastener are loose within the magazine body.

5. The apparatus of claim 1, wherein the magazine body further comprises a handle feature.

6. A fastening system comprising:
    a clip magazine, said clip magazine comprising:
        a magazine body comprising:
            a flange extending outwardly from the magazine body and configured to rest on a top, horizontal surface of a deck board;
            a lower portion comprising a board surface configured to face towards a vertical surface of the deck board, said lower portion further comprising a groove guide configured to hold a plurality of clips adjacent a vertical surface of the deck board; and
            an upper portion comprising a fastener cavity configured to hold a plurality of fasteners at a predetermined angle relative to the vertical surface of the deck board, the predetermined angle being an angle suitable to allow one of the plurality of fasteners to be forced through one of the plurality of clips and through the vertical surface of the deck board and into an underlying structure.

7. The fastening system of claim 6, wherein the magazine body includes a first and a second opposite end and a length extending therebetween, wherein the groove guide extends along the length of the magazine body such that the groove cavity is generally parallel to the vertical surface of the deck board when the flange is resting on the top, horizontal surface of the first deck board.

8. The fastening system of claim 7, further comprising an exit shaft configured to align at least one of the plurality of single-sided clips and at least one of the plurality of fasteners.

9. The fastening system of claim 7, further comprising an exit shaft configured to align at least one of the plurality of single-sided clips with a fastener opening in at least one of the plurality of fasteners.

10. The fastening system of claim 9, wherein the exit shaft includes an opening configured to allow insertion of a tool to make contact with a head of the at least one fastener.

11. The fastening system of claim 9, wherein the flange further comprises a removable wear plate configured to adjust a position of the fastener opening relative to the top, horizontal surface of the deck board.

12. The fastening system of claim 7, wherein the fastener cavity extends generally parallel to the groove guide along the length of the magazine body.

13. The fastening system of claim 12, further comprising a fastener feeder and a clip feeder configured to bias the plurality of fasteners and the plurality of clips towards the second end of the magazine body.

14. The fastening system of claim 13, wherein a pusher arm of the fastener feeder is configured to be disposed between two adjacent fasteners of the plurality of fasteners disposed within the fastener cavity.

15. The fastening system of claim 6, wherein the predetermined angle relative to the vertical surface of the deck board is approximately 45 degrees.

16. A fastening system comprising:
    a plurality of clips for fastening a first deck board to a structure, each of the clips comprising:

a body portion having a front side and a back side, the back side configured to rest against a vertical surface of the first deck board;

at least one horizontal portion extending outwardly from the front side of the body portion and configured to enter a groove of an adjacent deck board; and a fastener opening in the body portion for receiving a fastener, the fastener opening configured to allow the fastener to pass through the body portion and into the vertical surface of the first deck board; and a clip magazine comprising:

a magazine body comprising:

a flange extending outwardly from the magazine body and configured to rest on a top, horizontal surface of the first deck board;

a lower portion comprising a board surface configured to face towards the vertical surface of the first deck board when the flange is resting on the top, horizontal surface of the first deck board, said lower portion further comprising a groove guide configured to hold the back side of the plurality of clips substantially parallel to the vertical surface of the first deck board when the flange is resting on the top, horizontal surface of the first deck board; and an upper portion comprising a fastener cavity configured to receive a plurality of fasteners and to align an end-most fastener at a predetermined angle relative to the fastener opening of an end-most clip and the vertical surface of the first deck board when the flange is resting on the top, horizontal surface of the first deck board.

17. The fastening system of claim 16, wherein the magazine body includes a first and a second opposite end and a length extending therebetween, wherein the groove guide and the fastener cavity extend along the length of the magazine body and generally parallel to the vertical surface of the first deck board when the flange is resting on the top, horizontal surface of the first deck board.

18. The fastening system of claim 17, wherein the groove guide is configured to hold the plurality of clips substantially parallel to a longitudinal axis of the first deck board.

19. The fastening system of claim 16, wherein the flange further comprises a removable wear plate configured to adjust a position of the fastener opening relative to the top, horizontal surface of the first deck board.

20. The fastening system of claim 16, further comprising a fastener feeder and a clip feeder configured to bias the plurality of fasteners and the plurality of clips towards the second end of the magazine body.

* * * * *